(12) United States Patent
Yang et al.

(10) Patent No.: US 9,057,906 B2
(45) Date of Patent: Jun. 16, 2015

(54) CAPACITIVE TOUCH SCREENS, METHOD OF DRIVING THE SAME AND DISPLAYS

(71) Applicant: BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Weijie Zhao, Beijing (CN); Yingming Liu, Beijing (CN); Tao Ren, Beijing (CN); Xiaoliang Ding, Beijing (CN); Hongjuan Liu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 14/057,390

(22) Filed: Oct. 18, 2013

(65) Prior Publication Data

US 2014/0111710 A1    Apr. 24, 2014

(30) Foreign Application Priority Data

Oct. 19, 2012 (CN) .......................... 2012 1 0401907

(51) Int. Cl.
| | |
|---|---|
| G02F 1/135 | (2006.01) |
| G02F 1/1333 | (2006.01) |
| G02F 1/1343 | (2006.01) |
| G06F 3/044 | (2006.01) |
| G06F 3/041 | (2006.01) |

(52) U.S. Cl.
CPC .......... *G02F 1/13338* (2013.01); *G02F 1/1333* (2013.01); *G02F 1/1343* (2013.01); *G06F 3/044* (2013.01); *G06F 3/0412* (2013.01); *G06F 3/0416* (2013.01)

(58) Field of Classification Search
CPC .................. G02F 1/13338; G02F 2001/13312; G02F 1/133377; G02F 1/133512; G02F 1/133345; G02F 1/136286; G02F 1/133707; G02F 1/134336; G06F 3/0412; G06F 3/045; G06F 3/044
USPC .............................. 349/12, 84, 139
See application file for complete search history.

(56) References Cited

U.S. PATENT DOCUMENTS

| | | | |
|---|---|---|---|
| 2010/0225860 A1 | 9/2010 | Huang et al. | |
| 2012/0105337 A1 | 5/2012 | Jun et al. | |
| 2014/0111473 A1* | 4/2014 | Yang et al. | ..................... 345/174 |

FOREIGN PATENT DOCUMENTS

| | | |
|---|---|---|
| CN | 101825816 A | 9/2010 |
| CN | 102466907 A | 5/2012 |
| CN | 202838292 U | 3/2013 |

OTHER PUBLICATIONS

English abstract of CN202838292U, listed above, 1 page.
(Continued)

*Primary Examiner* — Mike Qi (57) ABSTRACT

A capacitive in cell touch panel, its driving method and a display device, in which, on the TFT array substrate, a pixel structure in which two adjacent rows of pixel units form one pixel unit group and two gate signal lines are disposed between the two rows of pixel units of the pixel unit group is adopted. Positions of gate signal lines between adjacent pixel unit groups can be saved by modifying positions of gate signal lines of two adjacent rows of pixel units and TFT switches. As such, touch driving lines with touch function can be set at the saved positions for gate signal lines and touch sensing electrodes can be disposed on the color filter substrate and extend in the column direction of the pixel units to realize touch function while ensuring high aperture ratio.

15 Claims, 8 Drawing Sheets

(56) References Cited

OTHER PUBLICATIONS

English abstract of CN102466907A, listed above, 1 page.
English abstract of CN101825816A, listed above, 1 page.
First Office Action (Chinese language) issued by the State Intellectual Property Office ("SIPO") on Feb. 4, 2015 for International Application No. 201210401907.X, 11 pages.
English translation of first Office Action issued by SIPO on Feb. 4, 2015 for International Application No. 201210401907.X, 11 pages.

* cited by examiner

CAPACITIVE TOUCH SCREENS, METHOD OF DRIVING THE SAME AND DISPLAYS

CROSS REFERENCE TO RELATED APPLICATIONS

This application claims priority from Chinese National Application No. 201210401907.X filed on Oct. 19, 2012, the contents of which are incorporated herein by reference.

FIELD OF THE INVENTION

Embodiments of the present invention relate to a capacitive in cell touch screen/panel, driving method of the same and display device.

BACKGROUND

With rapid development of the display technology, touch screen panels have become popular in human's life. At present, touch screen panels can be classified into the following types in terms of their constituting structures: Add On Mode Touch Panels, On Cell Touch Panels and In Cell Touch panels. For an add on mode touch panel, the touch panel and the liquid crystal display (LCD) are made separately and then bonded together to form a liquid crystal display with touch function, and disadvantages thereof are high manufacturing costs, low light transmission rate and thick modules. While for an in cell touch panel, touch electrodes of the touch panel are embedded in the liquid crystal display, so that the overall thickness of the module is decreased, and thus the manufacturing costs of the touch panel is reduced significantly, hence wining good graces of panel manufacturers.

Figure 1:
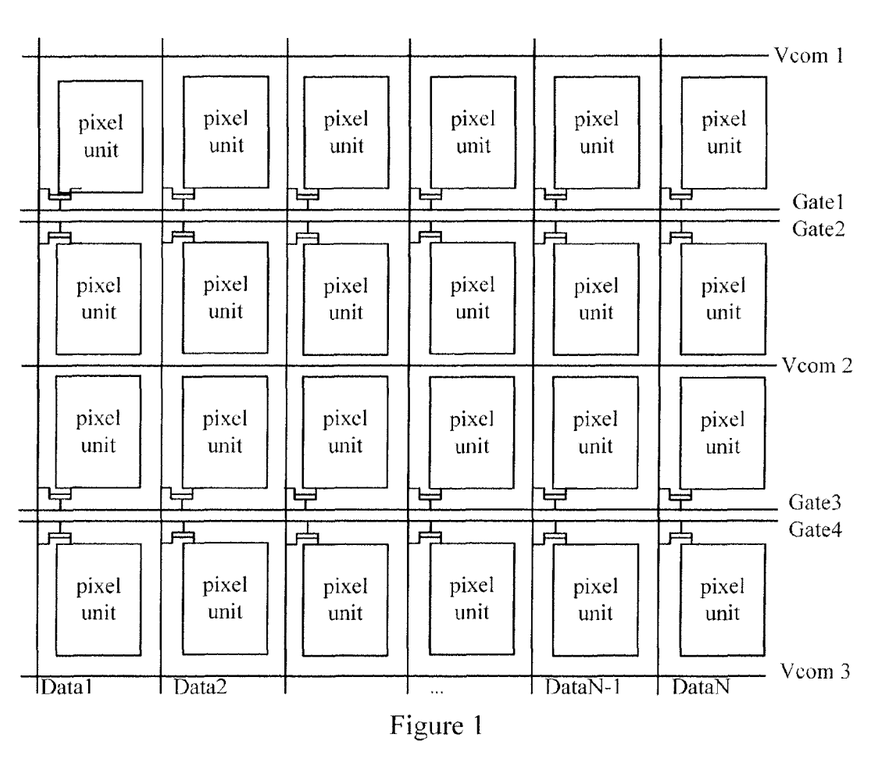
FIG. 1 illustrates a structural schematic view of a TFT array substrate in a display panel of prior art.

In order to improve the aperture ratio of a touch display screen/panel as far as possible, when designing the pixel structure in a TFT array substrate, the structure shown in FIG. 1 may be used, in which pixel units in lines 2 and 4 may be regarded as vertical revertion of a complete row of conventional pixel units. In this structure, every two adjacent rows of pixel units in the TFT array substrate belong to a pixel unit group, and the two gate signal lines between the two rows of pixel units, such as Gate 1 and Gate 2, Gate 3 and Gate 4 in FIG. 1, supply gate scan signals to the two rows of pixel units, respectively. In such a way, it is possible to design TFT switches in the two adjacent rows of pixel units together, which accordingly can decrease the area of the black matrix for blocking TFT switches and gate lines, contributing to improve aperture ratio of the touch screen panel. In addition, in the pixel structure shown in FIG. 1, positions of gate signal lines between adjacent pixel unit groups can be saved by modifying positions of the gate signal lines and TFT switches of two adjacent rows of pixel units. In such a way, it is possible to dispose common electrode lines Vcom1, Vcom2 and Vcom3 electrically connected with common electrodes at the saved positions for gate signal lines. Based on this structure, one common electrode line may be used to provide common voltage for two adjacent rows of pixel units, and the common electrode signals carried by common electrodes are more stable.

SUMMARY

Embodiments of the present invention provide a capacitive in cell touch panel, its driving method and a display device, for realizing a capacitive in cell touch panel with high aperture ratio.

An aspect of the present invention provides a capacitive in cell touch panel comprising:
a color filter substrate,
a thin film transistor (TFT) array substrate, and
a liquid crystal layer between said color filter substrate and said TFT array substrate, wherein said array substrate includes a plurality of pixel units arranged in matrix, every two adjacent rows of pixel units in said plurality of pixel units are one pixel unit group, two gate signal lines are disposed between the two rows of pixel units of said pixel unit group, and said two gate signal lines are configured to supply gate scan signals to the two rows of pixel units, respectively,
wherein said color filter substrate includes a plurality of touch sensing electrodes extending in a column direction of pixel units, and
wherein said TFT array substrate includes a plurality of touch driving lines extending in a row direction of the pixel units, each of said touch driving lines is located at a gap between the adjacent pixel unit groups, and in a display time period for a frame of a picture, said touch driving lines are configured to transfer common electrode signals and touch scanning signals in a time-division manner.

Another aspect of the present invention provides a display device comprising the capacitive in cell touch panel provided in the embodiments of the present invention.

A yet another aspect of the present invention provides a driving method of the above-mentioned capacitive in cell touch panel, comprising:
dividing a time period for the touch panel to display each frame into a display time period and a touch time period,
during the display time period, successively applying gate scanning signals to each gate signal line in said touch panel, applying gray scale signals to data signal lines to control rotation of liquid crystal molecules, and applying low level signals to the touch driving electrodes and the touch sensing electrodes at the same time, and
during the touch time period, applying touch scanning signals to touch driving lines electrically connected with the touch driving electrodes, and wherein the touch sensing electrodes couple and output voltage signals of said touch scanning signals, and wherein no signal is input into each gate signal line and data signal line in said touch panel.

BRIEF DESCRIPTION OF DRAWINGS

Embodiments of the present invention will be described in more detail below with reference to the accompany drawings to allow one of ordinary skill in the art to understand the present invention more clearly, in which.

DETAILED DESCRIPTION

In order to make the purposes, technical solutions and advantages of embodiments of the present invention more clear, technical solutions according to the embodiments of the present invention will be described clearly and completely below in conjunction with the accompanied drawings of embodiments of the present invention. It is to be understood that the described embodiments are part of but not all of exemplary embodiments of the present invention. Based on the described exemplary embodiments of the present invention, all other embodiments obtained by those of ordinary skill in the art without creative labor shall fall into the protection scope of the present invention.

Unless otherwise defined, all the technical and scientific terms used herein have the same meanings as commonly understood by one of ordinary skill in the art to which the present invention belongs. The terms "first," "second," etc., which are used in the description and the claims of the present application, are not intended to indicate any sequence, amount or importance, but for distinguishing various components. Also, the terms such as "one," "a/an," or "the" etc., are not intended to limit the amount, but for indicating the existence of at lease one. The terms "comprise/comprising," "include/including," etc., are intended to specify that the elements or the objects stated before these terms encompass the elements or the objects and equivalents thereof listed after these terms, but not preclude other elements or objects. The phrases "connect", "connected", etc., are not intended to define a physical connection or mechanical connection, but may include an electrical connection/coupling, directly or indirectly. "On," "under," "right," "left" and the like are only used to indicate relative position relationship, and when the position of the object which is described is changed, the relative position relationship may be changed accordingly.

Liquid crystal display technologies that can realize wide angle of vision mainly include In-Plane Switch (IPS) technology and Advanced Super Dimensional Switch (ADS) technology. In an Advanced Super Dimensional Switch technology, a multi-dimensional electric field is formed with both a parallel electric field produced at edges of pixel electrodes on the same plane and a vertical electric field produced between a pixel electrode layer and a common electrode layer, so that liquid crystal molecules at all orientations, which are located directly above the electrodes and between the pixel electrodes in a liquid crystal cell, can be rotated and aligned, which enhances the work efficiency of planar-oriented liquid crystals and increases light transmittance. The Advanced-Super Dimensional Switching technology can improve the picture quality of TFT-LCDs and has advantages of high transmissivity, wide viewing angles, high aperture/opening ratio, low chromatic aberration, no push Mura, etc. H-ADS (High Aperture Ratio-Advanced Super Dimensional Switch) is an important implementation of the ADS technology.

Embodiments of the present invention propose a new capacitive in cell touch screen panel structure based on the ADS technology and H-ADS technology. Hereinbelow, implementations of the capacitive in cell touch panel, its driving method and the display device provided in embodiments of the present invention will be described in detail with reference to drawings.

Thicknesses and shapes of layers of films in the drawings do not represent actual scale of the TFT array substrate or the color filter substrate, but for illustratively explain contents of the present invention.

Figure 2:
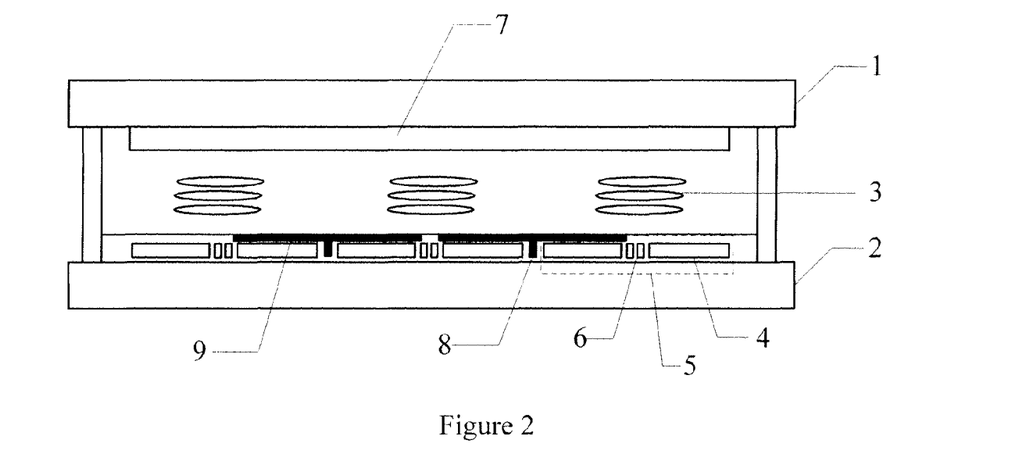
FIG. 2 illustrates a longitudinal sectional schematic view of a capacitive in cell touch panel provided in accordance with an embodiment of the present invention.
Figure 3:
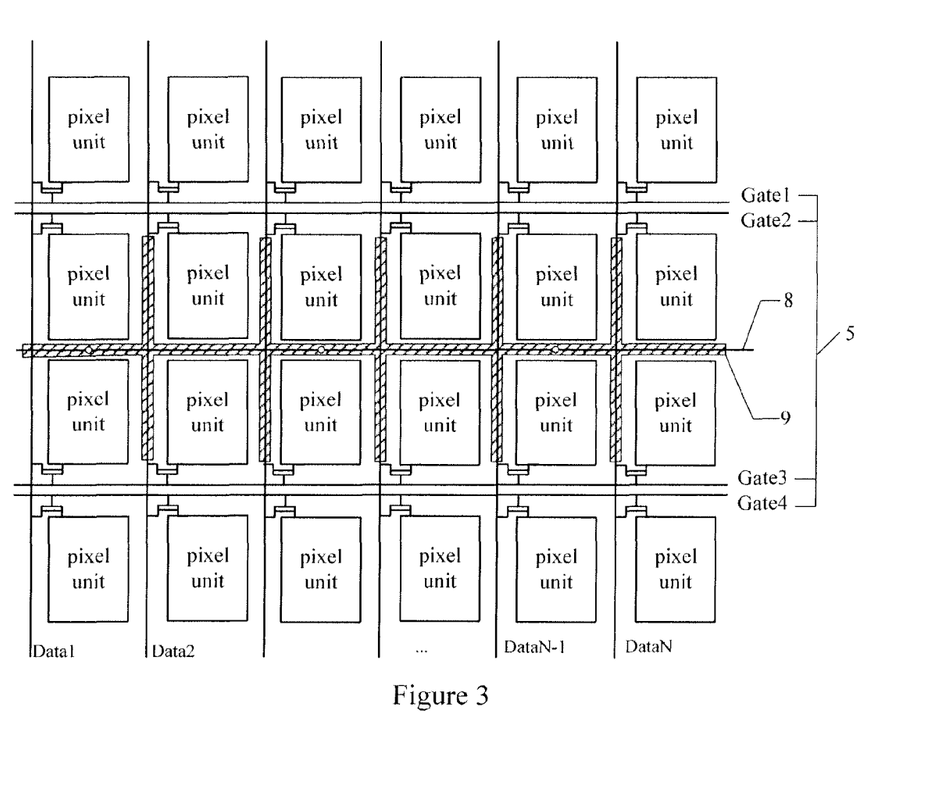
FIG. 3 illustrates one of schematic top views of the TFT array substrate in the capacitive in cell touch panel provided in accordance with an embodiment of the present invention.

FIGS. 2 and 3 show a longitudinal sectional view of the capacitive in cell touch panel provided and a top view of the TFT array substrate in the touch panel in embodiments of the present invention, respectively. As shown in FIGS. 2 and 3, the capacitive in cell touch panel provided in embodiments of the present invention includes: a color filter substrate 1, a TFT array substrate 2 and a liquid crystal layer 3 between the color filter substrate 1 and the TFT array substrate 2. The array substrate 2 includes a plurality of pixel units 4 arranged in matrix, with every two adjacent rows of pixel units 4 as one pixel unit group 5. There are two gate signal lines 6 disposed between the two rows of pixel units 4 for providing gate scanning signals to the two rows of pixel units 4, respectively. The color filter substrate 1 includes a plurality of touch sensing electrodes 7 extending in the column direction of the pixel units 4.

The TFT array substrate 2 includes a plurality of touch driving lines 8 extending in the row direction of the pixel units 4. Each touch driving line 8 is located in the gap between adjacent pixel unit groups 5. In the display time of one frame of a picture, said touch driving electrode line is configured to transfer common electrode signals and touch scanning signals in a time-division manner.

The above-mentioned capacitive in cell touch panel provided in embodiments of the present invention can save positions (space) of gate signal lines between adjacent pixel unit groups by modifying positions of the gate signal lines and the TFT switches of two adjacent rows of pixel units. Since the precision of a touch screen panel is generally in the order of millimeters, while the precision of a liquid crystal display is generally in the order of microns, i.e., the precision required for display is much greater than the precision required for touching. Therefore, disposing the touch driving lines for touch function at the saved positions for gate signal lines can not only ensure the precision for touch, but also will not occupy the aperture area of the pixel units excessively, hence realizing a touch screen panel with high aperture ratio.

In addition, the above-mentioned touch panel implementations provided in embodiments of the present invention are also applicable to the twisted nematic (TN) type. On the TN type TFT array substrate based on the structure of FIG. 1, a part of common electrode lines may be used as touch driving electrode lines and ITO touch driving electrodes are disposed in the same layer with and insulated from the ITO pixel electrodes; on the color filter substrate, strip-like ITO common electrodes are used as touch sensing electrodes. Since TN type belongs to conventional technology, it will not be described here.

Furthermore, in order to reduce mutual interference between display signals and touch signals of the touch panel, time-dividing driving mode of touch and display may be used for implementations to avoid mutual interference between display and touch during operation as far as possible.

Figure 4:
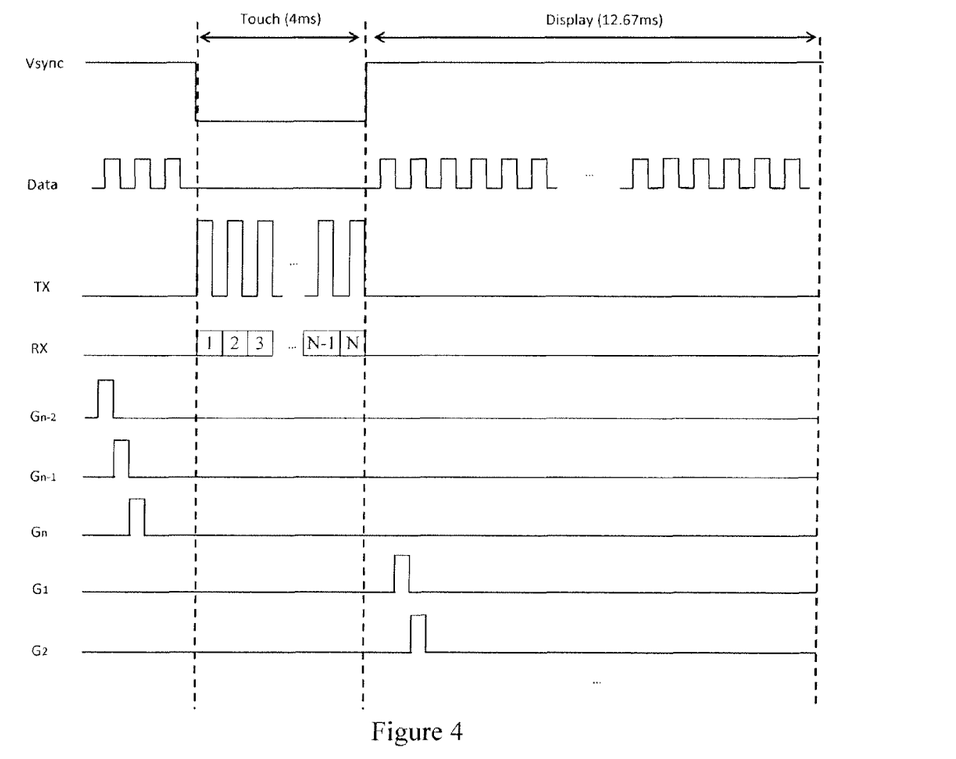
FIG. 4 is an operation timing diagram of the capacitive in cell touch panel provided in accordance with an embodiment of the present invention.

Embodiment(s) of the present invention provides a driving method for the above-mentioned capacitive in cell touch panel with a timing diagram as shown in FIG. 4 including:

First, the time for the touch panel to display each frame (Vsync) of a picture is divided into a display time period (Display) and a touch time period (Touch). For example, in the driving timing diagram as shown in FIG. 4, the time for the touch panel to display one frame of a picture is 16.67 ms, wherein 4 ms thereof is used as the touch time period and the remaining 12.67 ms is used as the display time period. Both time periods can be adjusted appropriately according to the processing capacity of IC chips and the design of Panel itself, and thus, the present invention is not limited thereto.

During the display time period (Display), low level signals are applied to the touch driving electrode Tx and the touch sensing electrode Rx. At the same time, gate scan signals are applied successively to each gate signal line G1, G2, . . . Gn in the touch panel, gray scale signals are applied to data signal lines Data to control the rotation of liquid crystal molecules. During this period of time, the operating principle of the liquid crystal panel is the same as normal liquid crystal panels.

During the touch time period (Touch), touch scanning signals are applied to touch driving lines electrically connected with the touch driving electrodes Tx, and the touch sensing electrode Rx couples and outputs voltage signals of the touch scanning signals. By finger touching, inductive capacitance between two electrodes at the touching position is changed, thereby changing the magnitude of the received voltage signal at the end of the touch sensing electrode Rx, so as to realize touch function. During the touch time period, no signal is input into each gate signal line and data signal line in the touch panel.

The structure of the TFT array substrate in the above-mentioned touch screen/panel will be described in detail below.

According to an embodiment, touch driving lines may be disposed in the same layer as gate signal lines in the TFT array substrate. No additional process is added when manufacturing the TFT array substrate, only one patterning process is needed to form patterns of gate signal lines and touch driving lines, which can save manufacturing costs and improve additional value of products.

Further, as shown in FIGS. 2 and 3, a plurality of touch driving electrodes 9 extend in the row direction of pixel units 4 in the TFT array substrate 2, each of which is located at a gap between adjacent pixel units 4 and is electrically connected with a touch driving line 8 overlappedly through at least one via.

Since touch driving electrodes are disposed at the gaps between adjacent pixel units, they will not occupy aperture regions of the pixel units. Therefore, in implementation, the common electrode layer in the array substrate of conventional HADS type liquid crystal panel may be partitioned, and patterns of touch driving electrodes at the gaps of the pixel units and common electrodes in the pixel units may be formed in the common electrode layer, that is, the touch driving electrodes and the common electrodes in the TFT array substrate are disposed in the same layer and are insulated from each other. While in the ADS type liquid crystal panel, the touch driving electrodes and ITO pixel electrodes may be disposed in the same layer and are insulated from each other. As such, during manufacturing the TFT array substrate, no additional process needs to be added, and only one patterning process is needed to form patterns of the touch driving electrodes and common electrodes.

Figure 5:
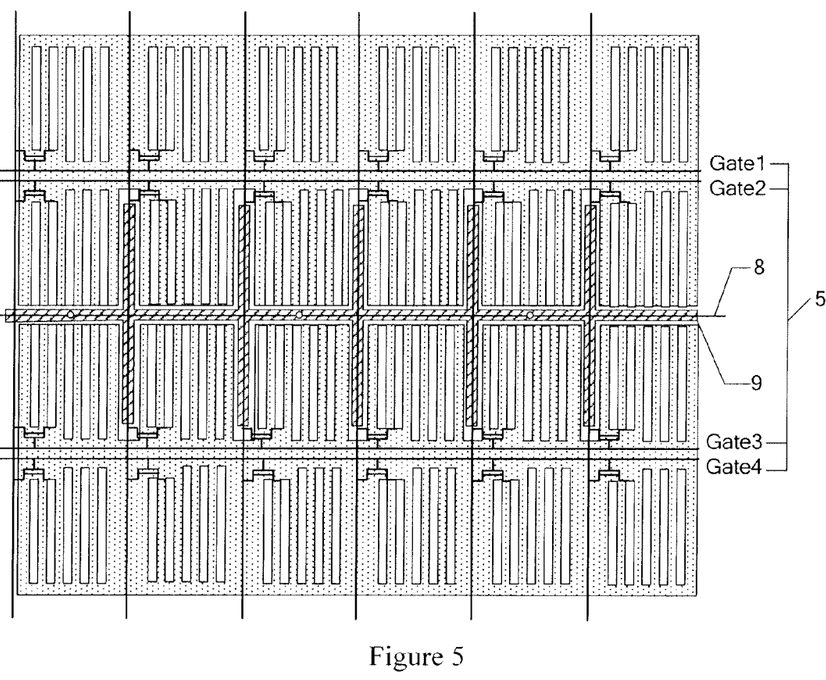
FIG. 5 illustrates another schematic top view of the TFT array substrate in the capacitive in cell touch panel provided in accordance with an embodiment of the present invention.

Generally, on the array substrate of conventional ADS type liquid crystal panel, the common electrode is located at a bottom layer (closer to the substrate) as a plate electrode, and the pixel electrode is located at an upper layer (closer to the liquid crystal layer) as a slit electrode, and an insulating layer is disposed between the pixel electrode and the common electrode. While on the array substrate of a HADS type liquid crystal panel, the pixel electrode is located at a bottom layer (closer to the substrate) as a plate electrode, and the common electrode is located at an upper layer (closer to the liquid crystal layer) as a slit electrode, and an insulating layer is disposed between the pixel electrode and the common electrode. Depending on the mode of the liquid crystal display panel applied by the above-mentioned touch panel, there may be a slit-like ITO electrode structure or a plate-like ITO electrode structure at positions of the common electrode of the common electrode layer corresponding to the aperture region of the pixel unit. That is, as shown in FIG. 5, for a HADS mode, the common electrode includes a slit-like ITO electrode that is an ITO electrode structure with slit in the aperture region of the pixel. For an ADS mode, the common electrode located in each pixel unit includes a plate-like ITO electrode to satisfy the requirement of liquid crystal display. Since the structure of the ADS mode and the HADS mode liquid crystal panel belongs to conventional technology, they will not be described here again.

Furthermore, for example, for a HADS type liquid crystal panel, since the touch driving electrodes and the common electrodes are provided in the same layer, they are generally made of ITO material. Due to the relatively high resistance of the ITO material, in order to reduce resistance of the touch driving electrodes and improve the SNR (Signal Noise Ratio) of the electrical signals transferred by the electrodes as much as possible, each touch driving electrode and the touch driving line overlapping with it may be electrically connected through a via, as shown in FIG. 3. This is like to connecting ITO electrodes and a plurality of metallic resistors including touch driving lines in parallel, so as to reduce resistance of electrodes as much as possible and hence improve SNR of the electrodes when they transfers signals.

Figure 6A:
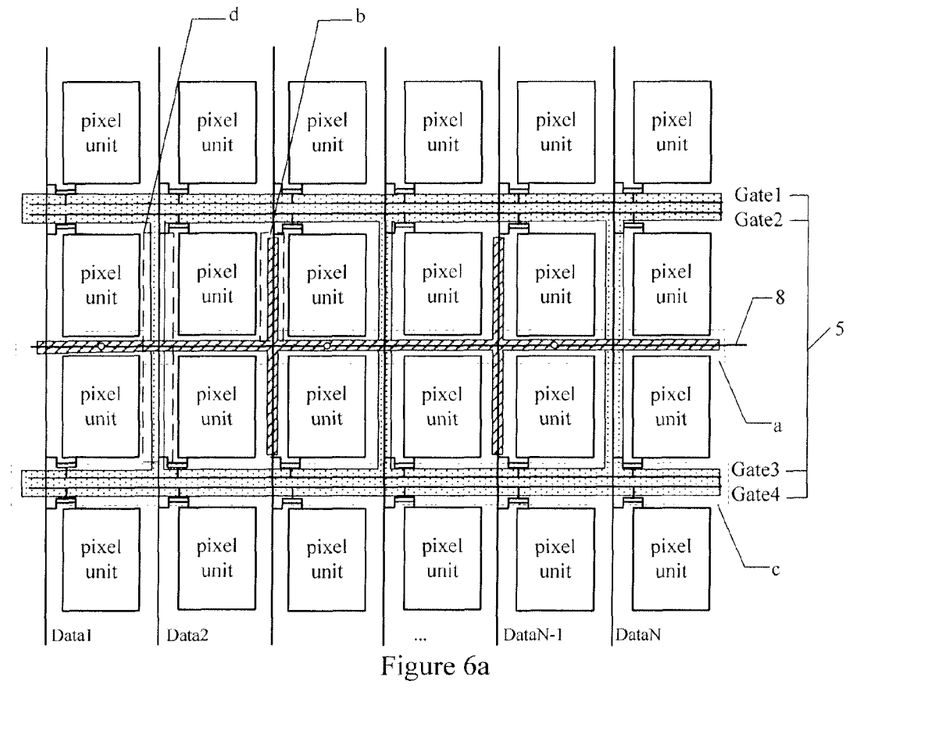
FIGS. 6a and 6b illustrate structural schematic views of touch driving electrodes and touch sensing electrodes in the capacitive in cell touch panel provided in accordance with an embodiment of the present invention.
Figure 6B:
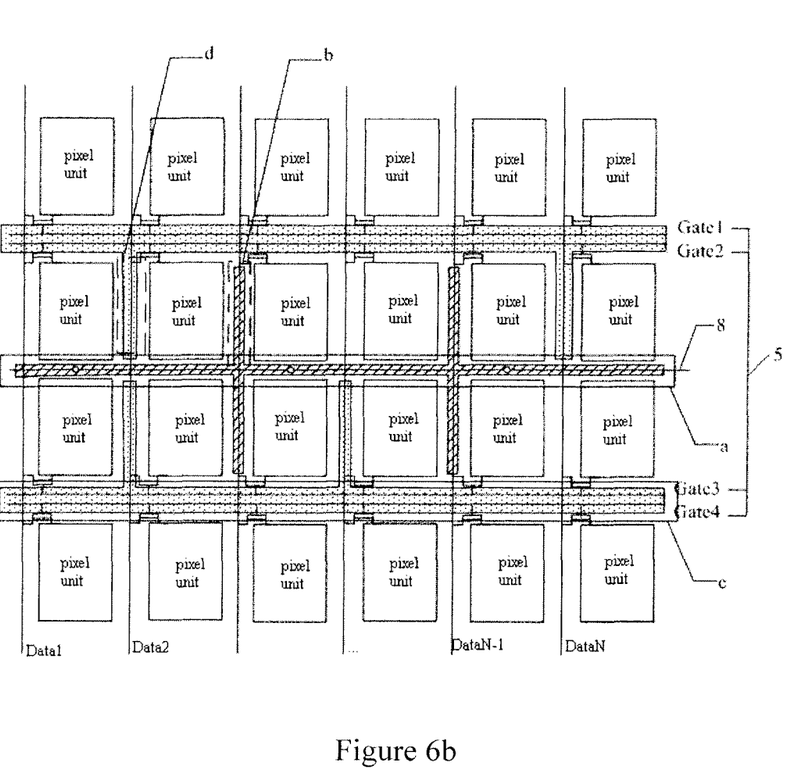

In the above-mentioned touch panel provided in embodiments of the present invention, as shown in FIGS. 6a and 6b, each touch driving electrode may include at least one transverse touch driving sub-electrode a and at least one longitudinal touch driving sub-electrode b that are electrically connected, wherein the transverse touch driving sub-electrode a is located at a gap between adjacent pixel unit groups; and the longitudinal touch driving sub-electrode b is located at a gap between adjacent columns of pixel units.

In a similar way, again as shown in FIGS. 6a and 6b, each touch sensing electrode may include at least one transverse touch sensing sub-electrode c and at least one longitudinal touch sensing sub-electrode d that are electrically connected, wherein the projection of the transverse touch sensing sub-electrode c on the TFT array substrate covers two lines of gate signal lines 5 between two rows of pixel units, and does not overlap the position of the transverse touch driving sub-electrode a on the TFT array substrate; the projection of the longitudinal touch sensing sub-electrode d on the TFT array substrate covers a gap between two adjacent columns of pixel units except the longitudinal touch driving sub-electrode, that is, the longitudinal driving sub-electrode b and the longitudinal sensing sub-electrode d do not overlap.

In the design of the above-mentioned touch driving electrode and the touch sensing electrode, the sub-electrodes in the touch driving sub-electrode and the touch sensing electrode are disposed alternately, which can properly decrease the right opposite area between the touch driving electrode and the touch sensing electrode, thereby decreasing the right opposite capacitance formed by the right opposite area of them, so as to reduce interference on the display signal by the touch signal and improve touch sensitivity. Compared with FIGS. 6a, the design of FIG. 6b can further decrease the right opposite area between the touch driving electrode and the touch sensing electrode, and can reduce the coupling capacitance between adjacent longitudinal touch driving sub-electrode b and longitudinal touch sensing sub-electrode d, so as to further reduce interference on the display signal by the touch signal and improve touch sensitivity.

In addition, in order to further reduce the over large right opposite capacitance and coupling capacitance generated between the touch sensing electrode and the touch driving electrode, in the touch panel provided in the embodiments of the present invention, the touch panel area is further divided into: touch driving electrode separate arrangement areas, touch sensing electrode separate arrangement areas and common areas arranged in a staggered manner; wherein, in the touch driving electrode separate arrangement areas, only touch driving electrodes are disposed;

in the touch sensing electrode separate arrangement areas, only touch sensing electrodes are disposed;

in the common areas, both touch driving electrodes and touch sensing electrodes are disposed.

The arrangement of the touch driving electrode separate arrangement areas, touch sensing electrode separate arrangement areas and common areas may be configured depending on the requirement for touch precision.

Figure 7:
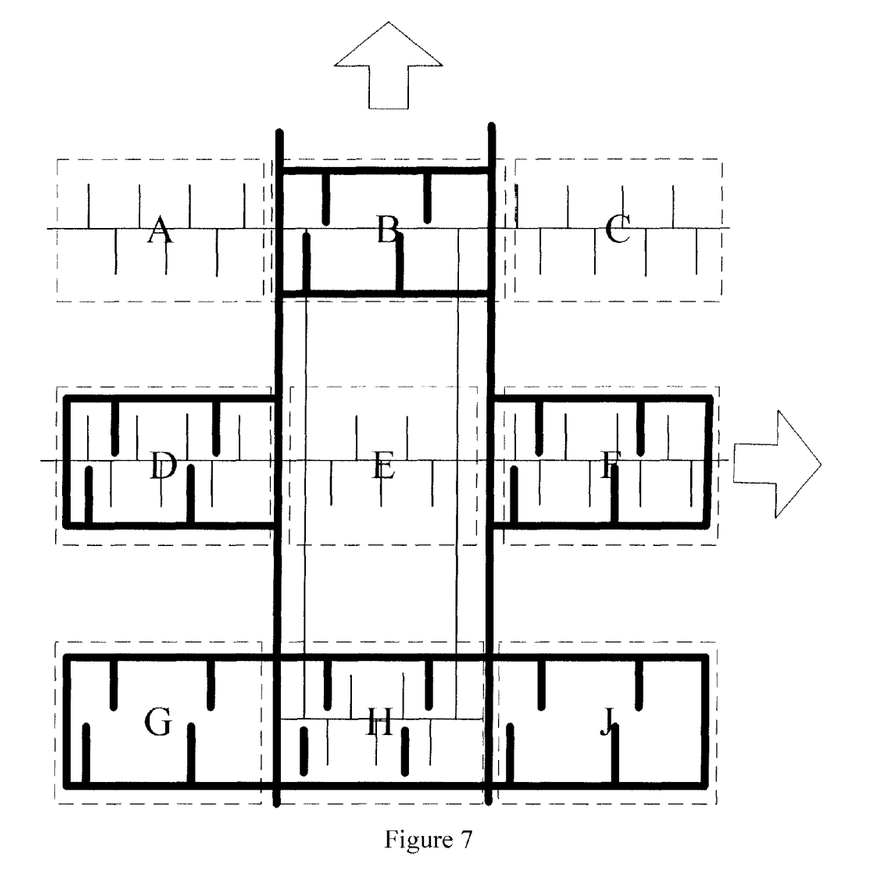
FIG. 7 is a schematic diagram of sub-areas where a touch driving electrode and a touch sensing electrode are overlapped hi accordance with an embodiment of the present invention.

For example, as shown in FIG. 7, thin lines in the figure show touch driving electrodes extending in a direction of transverse arrow, thick lines show touch sensing electrodes extending in a direction of longitudinal arrow, and the touch panel is divided into 9 areas. The Common areas are B, D and F, where patterns of both of the touch sensing electrodes and touch driving electrodes exist, and right opposite capacitance and coupling capacitance can be generated between the touch sensing electrodes and the touch driving electrodes. Touch sensing electrode separate arrangement areas are G and J, where only patterns of the touch sensing electrodes exist and no pattern of touch driving electrodes exist, therefore no right opposite capacitance and coupling capacitance will be generated. Touch driving electrode separate arrangement areas are A, C and E, where only patterns of touch driving electrodes exist and no pattern of touch sensing electrodes exist, therefore no right opposite capacitance and coupling capacitance will be generated. It is understood that the size and distribution of the above-mentioned three kinds of areas can be designed depending on the right opposite capacitance value and coupling capacitance value as need.

The above-mentioned touch sensing electrodes may be located between the substrate of color filter substrate and the color resin, and may also be located on one side of the color resin of the color filter substrate facing the liquid crystal layer.

Since the touch sensing electrodes disposed on the color filter substrate will not block pixel units, materials for the touch sensing electrodes may be transparent conductive oxides such as ITO or IZO, and may also be metals, for example. When a metal is used to make the touch sensing electrodes, their resistance may be effectively reduced. And when a metal is used to make the touch sensing electrodes, the touch sensing electrodes are generally disposed on a side of the black matrix (BM) of the color filter substrate facing the liquid crystal layer.

Figure 8:
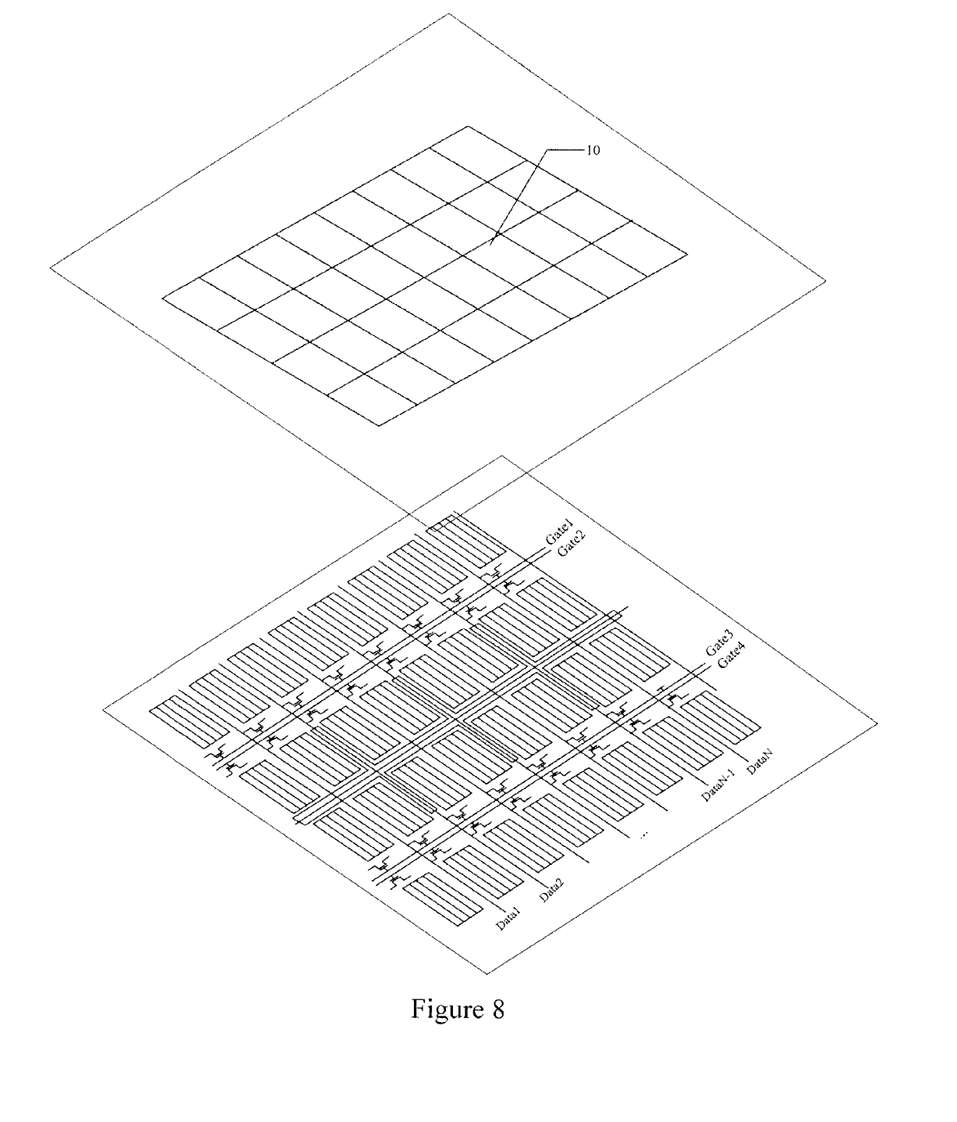
FIG. 8 is a schematic diagram of the capacitive in cell touch panel having an anti-electrostatic protection film provided in accordance with an embodiment of the present invention.

Furthermore, a grounded anti-electrostatic protection film can be disposed on another side of the color filter substrate facing away from the liquid crystal layer, which can prevent static electricity. As shown in FIG. 8, to avoid the impact of the anti-electrostatic protection film 10 on the touch function of the touch panel, the anti-electrostatic protection film is generally configured in a grid structure that allows the body electric field to penetrate mesh of the anti-electrostatic protection film and enter the touch panel.

Based on the same inventive concept, embodiments of the present invention further provide a display device comprising the above-mentioned capacitive in cell touch panel provided in the embodiments of the present invention. The implementations of the display device can refer to embodiments of the above-mentioned capacitive in cell touch panel, and the same contents will not be repeated here.

In the capacitive in cell touch screen panel, its driving method and the display device provided in the embodiments of the present invention, on the TFT array substrate, a pixel structure in which two adjacent rows of pixel units form one pixel unit group and two gate signal lines are disposed between two rows of pixel units of the pixel unit group is adopted. Positions of gate signal lines between adjacent pixel unit groups may be saved by modifying positions of gate signal lines of two adjacent rows of pixel units and TFT switches. As such, the touch driving lines with touch function can be set at the saved positions for the gate signal lines and the touch sensing electrodes are disposed on the color filter substrate and extend in the column direction of the pixel units, so as to realize touch function while ensuring high aperture ratio.

It is understood that those skilled in the art can make various modifications and variations to the present invention without departing from the spirit and scope of the present invention, and it is intended that the present invention contains these modifications, variations and any equivalents that fall into the scope of the present invention.

The invention claimed is:

1. A capacitive in cell touch panel, comprising:
a color filter substrate,
a thin film transistor (TFT) array substrate, and
a liquid crystal layer between said color filter substrate and said TFT array substrate, wherein said array substrate includes a plurality of pixel units arranged in matrix, every two adjacent rows of pixel units in said plurality of pixel units are one pixel unit group, two gate signal lines are disposed between the two rows of pixel units of said pixel unit group, and said two gate signal lines are configured to supply gate scan signals to the two rows of pixel units, respectively,
wherein said color filter substrate includes a plurality of touch sensing electrodes extending in a column direction of pixel units, and
wherein said TFT array substrate includes a plurality of touch driving lines extending in a row direction of the pixel units, each of said touch driving lines is located at a gap between the adjacent pixel unit groups, and during a display time period for a frame of a picture, said touch driving lines are configured to transfer common electrode signals and touch scanning signals in a time-division manner.

2. The touch panel of claim 1, wherein said TFT array substrate further includes a plurality of touch driving electrodes extending in a row direction of pixel units, each of said touch driving electrodes is located at a gap between adjacent pixel units and is electrically connected with a touch driving line overlappedly through at least one via hole.

3. The touch panel of claim 2, wherein said touch driving lines and gate signal lines in said TFT array substrate are disposed in a same layer.

4. The touch panel of claim 3, wherein each of said touch driving electrodes comprises at least one transverse touch driving sub-electrode and at least one longitudinal touch driving sub-electrode that are electrically connected,
said transverse touch driving sub-electrode is located at a gap between adjacent pixel unit groups, and said longitudinal touch driving sub-electrode is located at a gap between adjacent columns of pixel units.

5. The touch panel of claim 2, wherein said touch driving electrodes and said common electrodes or pixel electrodes in said TFT array substrate are disposed in a same layer and insulated from each other.

6. The touch panel of claim 5, wherein each of said touch driving electrodes comprises at least one transverse touch driving sub-electrode and at least one longitudinal touch driving sub-electrode that are electrically connected,
said transverse touch driving sub-electrode is located at a gap between adjacent pixel unit groups, and
said longitudinal touch driving sub-electrode is located at a gap between adjacent columns of pixel units.

7. The touch panel of claim 2, wherein each of said touch driving electrodes comprises at least one transverse touch driving sub-electrode and at least one longitudinal touch driving sub-electrode that are electrically connected,
said transverse touch driving sub-electrode is located at a gap between adjacent pixel unit groups, and
said longitudinal touch driving sub-electrode is located at a gap between adjacent columns of pixel units.

8. The touch panel of claim 1, wherein each of said touch driving electrodes comprises at least one transverse touch driving sub-electrode and at least one longitudinal touch driving sub-electrode that are electrically connected, said transverse touch driving sub-electrode is located at a gap between adjacent pixel unit groups, and
said longitudinal touch driving sub-electrode is located at a gap between adjacent columns of pixel units.

9. The touch panel of claim 8, wherein each of said touch sensing electrodes comprises at least one transverse touch sensing sub-electrode and at least one longitudinal touch sensing sub-electrode that are electrically connected, wherein
a projection of said transverse touch sensing sub-electrode on the TFT array substrate covers the two gate signal lines between two rows of pixel units, and
a projection of said longitudinal touch sensing sub-electrode on the TFT array substrate covers a gap between adjacent columns of pixel units except said longitudinal touch driving sub-electrode.

10. The touch panel of claim 9, wherein said touch panel comprises touch driving electrode separate arrangement areas, touch sensing electrode separate arrangement areas and common areas arranged in a staggered manner; and wherein
in said touch driving electrode separate arrangement areas, only said touch driving electrodes are disposed;
in said touch sensing electrode separate arrangement areas, only said touch sensing electrodes are disposed; and
in said common areas, both said touch driving electrodes and said touch sensing electrodes are disposed.

11. The touch panel of claim 1, wherein said touch sensing electrodes are located between a substrate of said color filter substrate and a color resin, or located on a side of the color resin of said color filter substrate facing said liquid crystal layer.

12. The touch panel of claim 11, further comprising: an anti-electrostatic protection film located on a side of said color filter substrate facing away from said liquid crystal layer and grounded, wherein said anti-electrostatic protection film includes a grid structure.

13. The touch panel of claim 1, further comprising: an anti-electrostatic protection film located on a side of said color filter substrate facing away from said liquid crystal layer and grounded, wherein said anti-electrostatic protection film includes a grid structure.

14. A display device comprising a capacitive in cell touch panel of claim 1.

15. A driving method of the capacitive in cell touch panel of claim 1, comprising:
dividing a time period for the touch panel to display each frame of a picture into a display time period and a touch time period,
during the display time period, successively applying gate scanning signals to each of gate signal lines in said touch panel, applying gray scale signals to data signal lines to control the rotation of liquid crystal molecules, and applying low level signals to the touch driving electrodes and the touch sensing electrodes at the same time, and
during the touch time period, applying touch scanning signals to touch driving lines electrically connected with touch driving electrodes, wherein the touch sensing electrodes couple and output voltage signals of said touch scanning signals, and no signal is input into each of the gate signal lines and data signal lines in said touch panel.

* * * * *